United States Patent
DeFrank et al.

(10) Patent No.: US 8,955,625 B2
(45) Date of Patent: Feb. 17, 2015

(54) STACKABLE MOTOR

(75) Inventors: William J. DeFrank, Livonia, MI (US); Seong Jun Kim, Ann Arbor, MI (US)

(73) Assignee: ALTe Technologies, Inc., Auburn Hills, MI (US)

( * ) Notice: Subject to any disclaimer, the term of this patent is extended or adjusted under 35 U.S.C. 154(b) by 809 days.

(21) Appl. No.: 12/879,296

(22) Filed: Sep. 10, 2010

(65) Prior Publication Data

US 2011/0065547 A1    Mar. 17, 2011

Related U.S. Application Data

(60) Provisional application No. 61/241,590, filed on Sep. 11, 2009.

(51) Int. Cl.
*B60W 10/08* (2006.01)
*B60K 1/02* (2006.01)

(52) U.S. Cl.
CPC ........................................ *B60K 1/02* (2013.01)
USPC ................................ 180/65.245; 180/65.285

(58) Field of Classification Search
USPC ...................... 180/65.245, 65.25, 65.1, 65.31; 903/906
See application file for complete search history.

(56) References Cited

U.S. PATENT DOCUMENTS

| | | | |
|---|---|---|---|
| 5,371,445 A | 12/1994 | Couetoux | |
| 5,419,406 A * | 5/1995 | Kawamoto et al. | 180/65.6 |
| 5,537,011 A | 7/1996 | Bachman et al. | |
| 5,574,340 A | 11/1996 | Bisel et al. | |
| 5,988,307 A * | 11/1999 | Yamada et al. | 180/243 |
| 6,053,842 A * | 4/2000 | Kitada et al. | 477/5 |
| 6,083,139 A * | 7/2000 | Deguchi et al. | 477/5 |
| 7,265,505 B2 | 9/2007 | Nakai et al. | |
| 7,395,889 B2 * | 7/2008 | Sugiyama et al. | 180/65.285 |
| 7,479,080 B2 * | 1/2009 | Usoro | 475/5 |
| 7,661,495 B2 * | 2/2010 | Zohrer et al. | 180/65.22 |
| 8,016,061 B2 * | 9/2011 | Jeon et al. | 180/65.22 |
| 8,183,820 B2 * | 5/2012 | Anwar et al. | 320/104 |
| 8,257,214 B2 * | 9/2012 | Knoblauch | 475/5 |
| 8,307,924 B2 * | 11/2012 | Wang et al. | 180/65.23 |
| 8,335,603 B2 * | 12/2012 | Mitsutani et al. | 701/22 |
| 2005/0211478 A1 * | 9/2005 | Sakuma et al. | 180/65.1 |

* cited by examiner

*Primary Examiner* — Jeffrey J Restifo

(57) ABSTRACT

A vehicle comprises a plurality of motors operatively connected with one another. The vehicle is powered with the plurality of motors individually and in combination with one another to primarily operate each of the plurality of motors within a predetermine efficiency range.

21 Claims, 5 Drawing Sheets

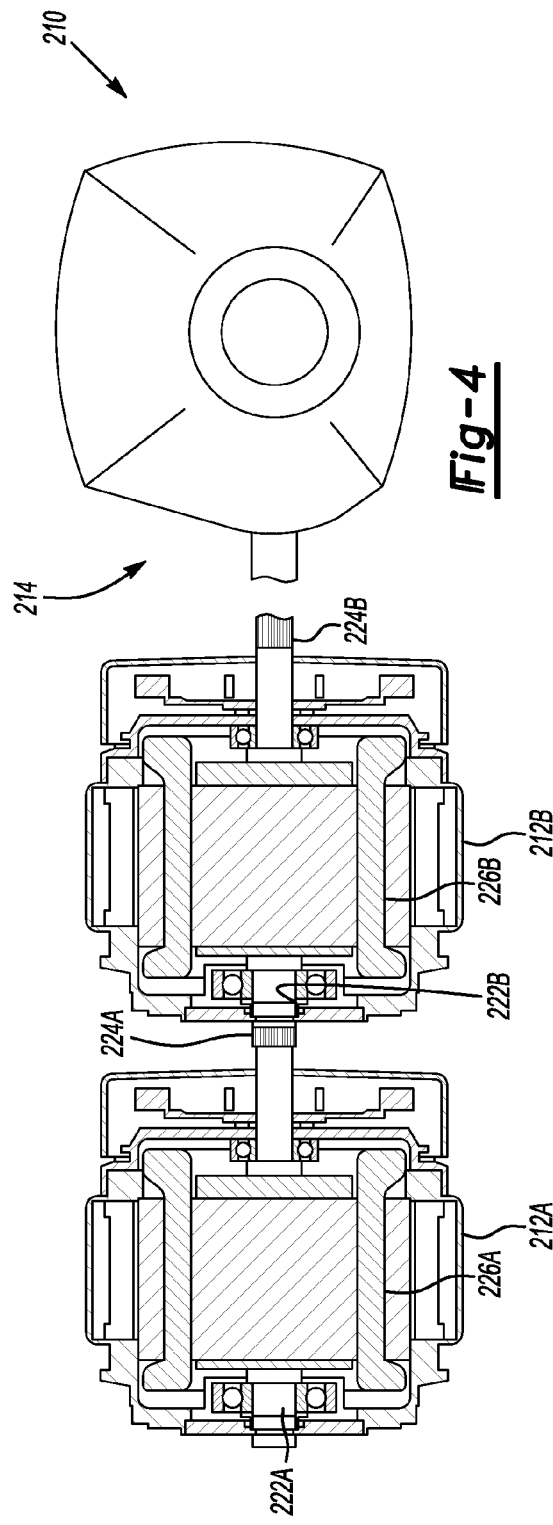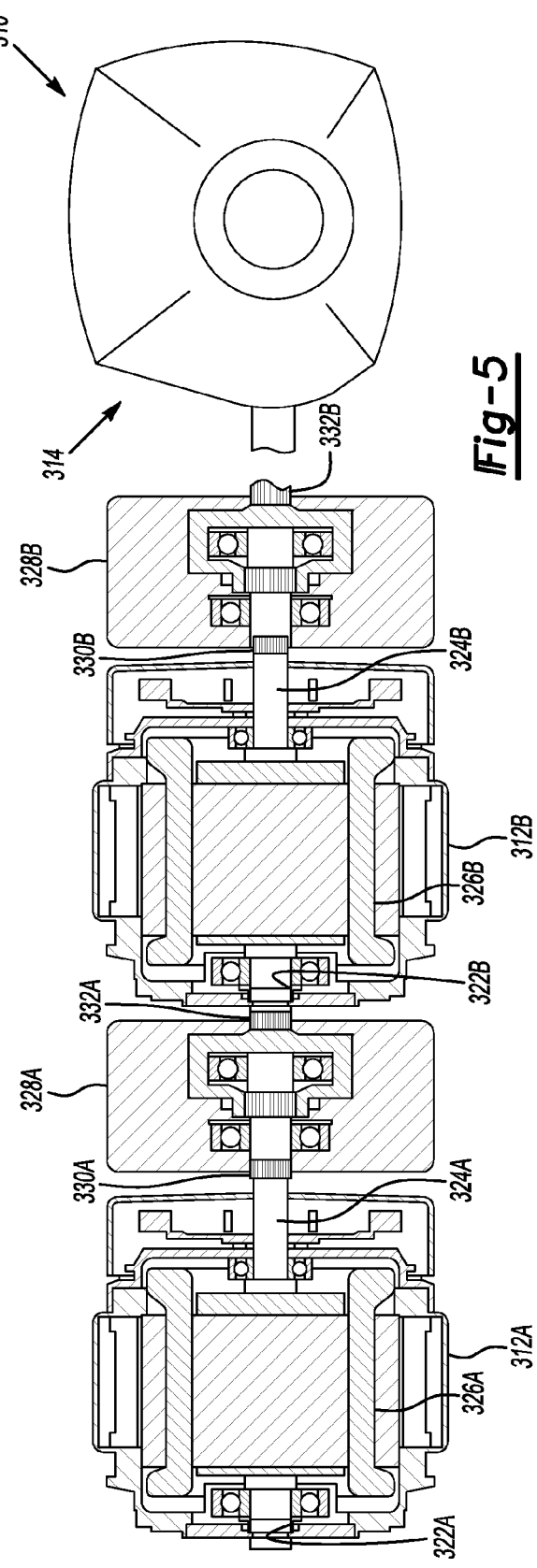

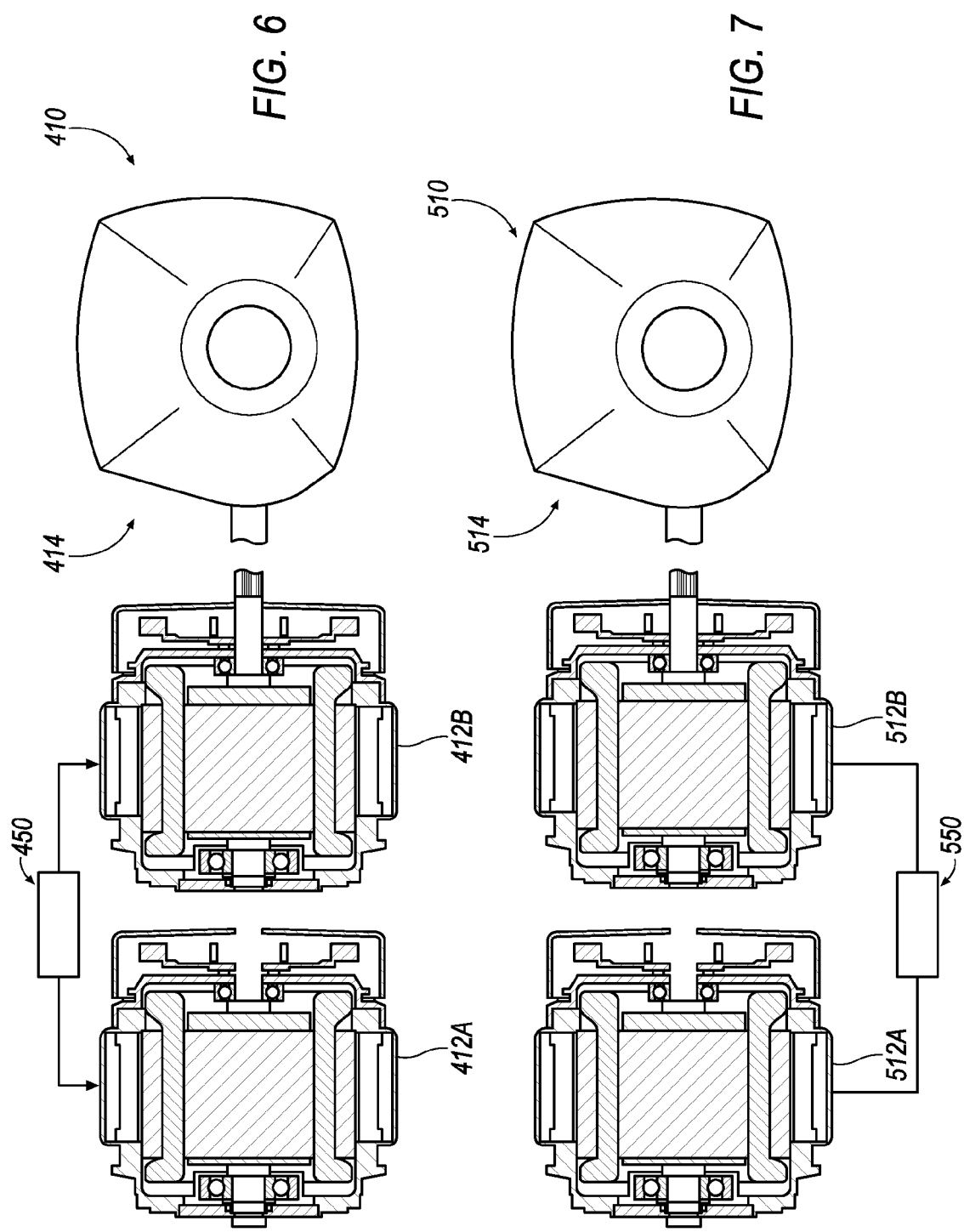

STACKABLE MOTOR

CROSS REFERENCE TO RELATED APPLICATIONS

This application claims the benefit of U.S. Provisional Application Ser. No. 61/241,590 filed Sep. 11, 2009, the entire contents of which are hereby incorporated by reference.

TECHNICAL FIELD

The present invention relates, generally, to an electric motor for use with a hybrid vehicle, and more specifically, to an electric motor that can be combined with other motors to power a vehicle.

BACKGROUND

Advancements in technology and the growing concern for environmentally efficient vehicles have led to the use of alternate fuel and power sources for vehicles. Electric vehicles or hybrid electric vehicles use electro mechanical devices (motors) to power the vehicle. In order to provide the required torque and power to operate the vehicle the motor must be designed to operate over a broad operating range. When a motor is chosen to act for an all purpose function, such as driving a vehicle, the motor needs to have the capacity for all load conditions, including the capacity to meet the maximum torque and power demands of the vehicle.

However, vehicles do not require peak torque and power at all times of operation. During normal operating conditions there is excess torque and power available from the motor. Additionally, motors, like any power source, have certain efficiency ranges in which they achieve their optimal performance. Sizing the motor to provide the capacity for all load conditions results in an over-sized motor that must bear the inefficiency when not operating at the optimum range. Inefficiencies of the over-sized motor are most apparent when operating at low speed. At low operating speed the forces to overcome the mass of the rotor contributes to great inefficiencies. Another inefficiency from an oversized motor is, the centrifugal forces required to start and stop the motor requires excess power and depletes the available energy more than necessary.

Additionally, vehicles are available in a variety of sizes and weights which results in additional variety in the motor capacity required among various vehicles. Therefore, the larger vehicles must default to larger and unique motors. The cost to design, manufacture and carry inventory on the variety of motors required results in cost inefficiencies as well.

SUMMARY

A vehicle comprises a plurality of motors that are operatively connected with one another. The plurality of motors is operable to power the vehicle individually and in combination with one another. Each of the plurality of motors are generally identical to one another. Alternatively, the plurality of motors is operable to power the vehicle individually and in combination with one another such that each of the plurality of motors primarily operates in a predetermined efficiency range.

A method of powering a vehicle comprises operatively connecting a plurality of motors with one another and powering the vehicle with the plurality of motors individually and in combination with one another to primarily operate each of the plurality of motors within a predetermined efficiency range.

The above features and advantages, and other features and advantages of the present invention will be readily apparent from the following detailed description of the preferred embodiments and best modes for carrying out the present invention when taken in connection with the accompanying drawings and appended claims.

BRIEF DESCRIPTION OF THE DRAWINGS

FIG. 4 is a schematic illustration of a third embodiment of the stackable motor for a vehicle;

FIG. 5 is a schematic illustration of a fourth embodiment of the stackable motor for a vehicle;

FIG. 6 is a schematic illustration of a fifth embodiment of the stackable motor for a vehicle; and FIG. 7 is a schematic illustration of a sixth embodiment of the stackable motor for a vehicle.

DETAILED DESCRIPTION

Figure 1:
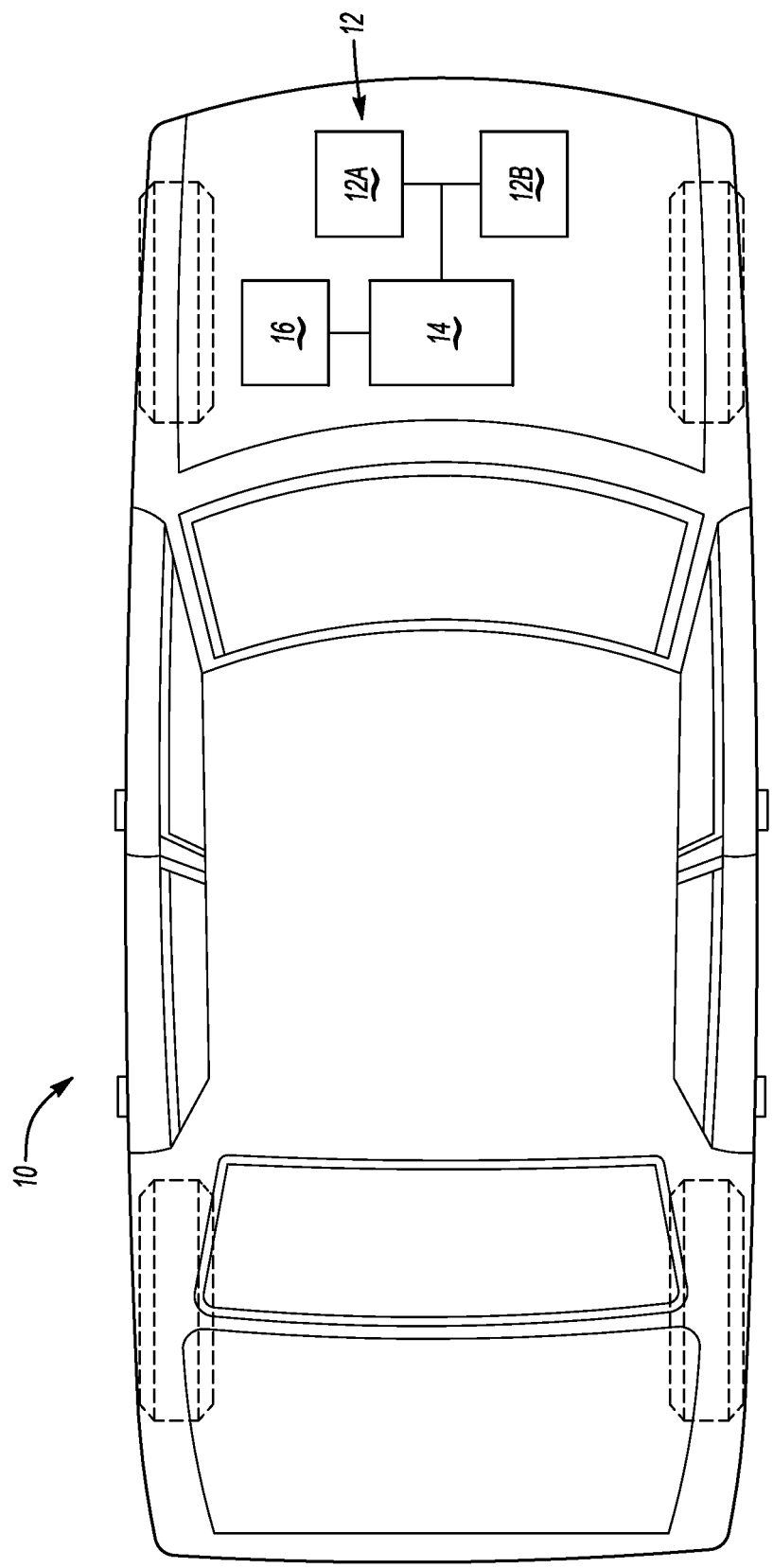
FIG. 1 is a schematic illustration of an electric vehicle having a first embodiment of a stackable motor of the present invention.

Referring to the Figures, wherein like reference numbers refer to the same or similar components throughout the several views, FIG. 1 schematically illustrates a vehicle 10 including at least one motor 12, and a transmission 14. The vehicle 10 may be any vehicle that utilizes an electric motor to provide the vehicle with drive, such as an electric vehicle, a hybrid electric vehicle, or a fuel cell vehicle. Therefore, in addition to the at least one motor 12 the vehicle 10 may also include an internal combustion engine 16.

In the embodiment shown there is a first motor 12A and a second motor 12B. The first motor 12A and the second motor 12B are the same size and capacity as one another. The first motor 12A and the second motor 12B are operatively connected to one another to drive the transmission 14. In the embodiment shown the first motor 12A and the second motor 12B are coupled to one another. In this manner, the first motor 12A and the second motor 12B are stackable to provide the capacity required for the vehicle 10 while primarily operating within the efficiency ranges for the first motor 12A and the second motor 12B. Therefore, one large electric motor may be replaced by multiple smaller motors 12. The first motor 12A and the second motor 12B may be any type of electromechanical device to provide power, such as an induction motor, permanent magnet machine, A/C or D/C motors, etc.

The first motor 12A and the second motor 12B may be coupled together directly, through clutches or a solid shaft connection, or indirectly, such as a serpentine belt. Direct coupling of the first motor 12A to the second motor 12B would provide an efficient arrangement with few losses. Indirect coupling may provide a more flexible arrangement for packaging the first motor 12A and the second motor 12B within the vehicle 10. One skilled in the art would be able to select the manner of coupling most suited for a particular vehicle 10. Any number of generally identical motors, 12 may be combined or stacked to provide the capacity required by the vehicle 10.

The first motor 12A acts as the primary motor and operates to drive the transmission 14 while the vehicle 10 is operating at steady speeds. The second motor 12B acts as an additional power source and engages to drive the transmission 14 when additional operating loads are placed on the motors 12, such as during accelerations of the vehicle 10. The second motor 12B would engage any time the operating loads exceed the capacity of the first motor 12A. Alternatively, the second motor 12B may be engaged prior to the capacity of the first motor 12A and at any time when the first motor 12A begins to operate outside of the desired efficiency range. In this manner the first motor 12A and the second motor 12B may both operate within their efficiency range for greater periods of time and the overall vehicle 10 efficiency will be increased.

In the above embodiment, the first motor 12A is the primary motor for the vehicle 10 and the second motor 12B is used to provide additional power and torque when required by the vehicle 10. Alternatively, the second motor 12B may be the primary motor and the first motor 12A may be used to provide additional power and torque. Additionally, the first motor 12A and the second motor 12B may alternately be the primary motor and the other would provide the additional power and torque. In this manner, even overall wear on both the first motor 12A and the second motor 12B may be maintained.

Further, the primary motor 12A or 12B and the additional motor 12B or 12A may be engaged or disengaged to maintain operation within the efficiency ranges. The primary motor 12A or 12B and the additional motor 12B or 12A may also engage or disengage in cooperation with the shift strategy of the transmission 14 to maintain maximum efficiency of the vehicle 10. In this manner, nontraditional shift strategies of the transmission 14 may be utilized in combination with the motors 12 to increase the efficiency of the vehicle 10.

Additionally, the first motor 12A or the second motor 12B may act as the primary motor in case of mechanical trouble of the other motor 12A-B. In this instance the primary motor 12A-B would not be able to meet the full capacity of the vehicle 10. However, the vehicle 10 would operate in a restricted or limp-home mode but would allow the vehicle 10 operator to reach their destination.

Figure 2:
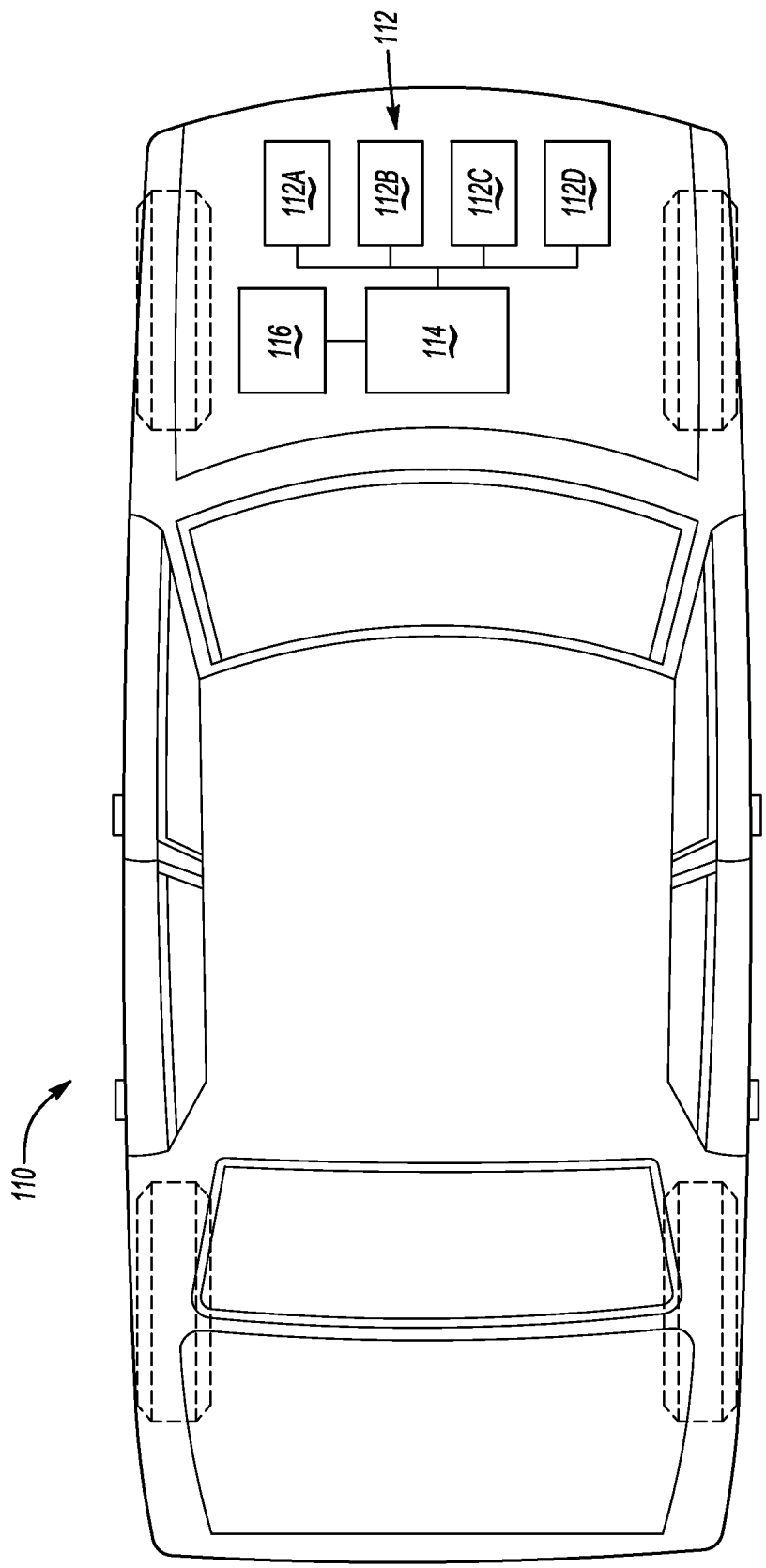
FIG. 2 is a schematic illustration of an electric vehicle having a second embodiment of the stackable motor of the present invention.
Figure 3:
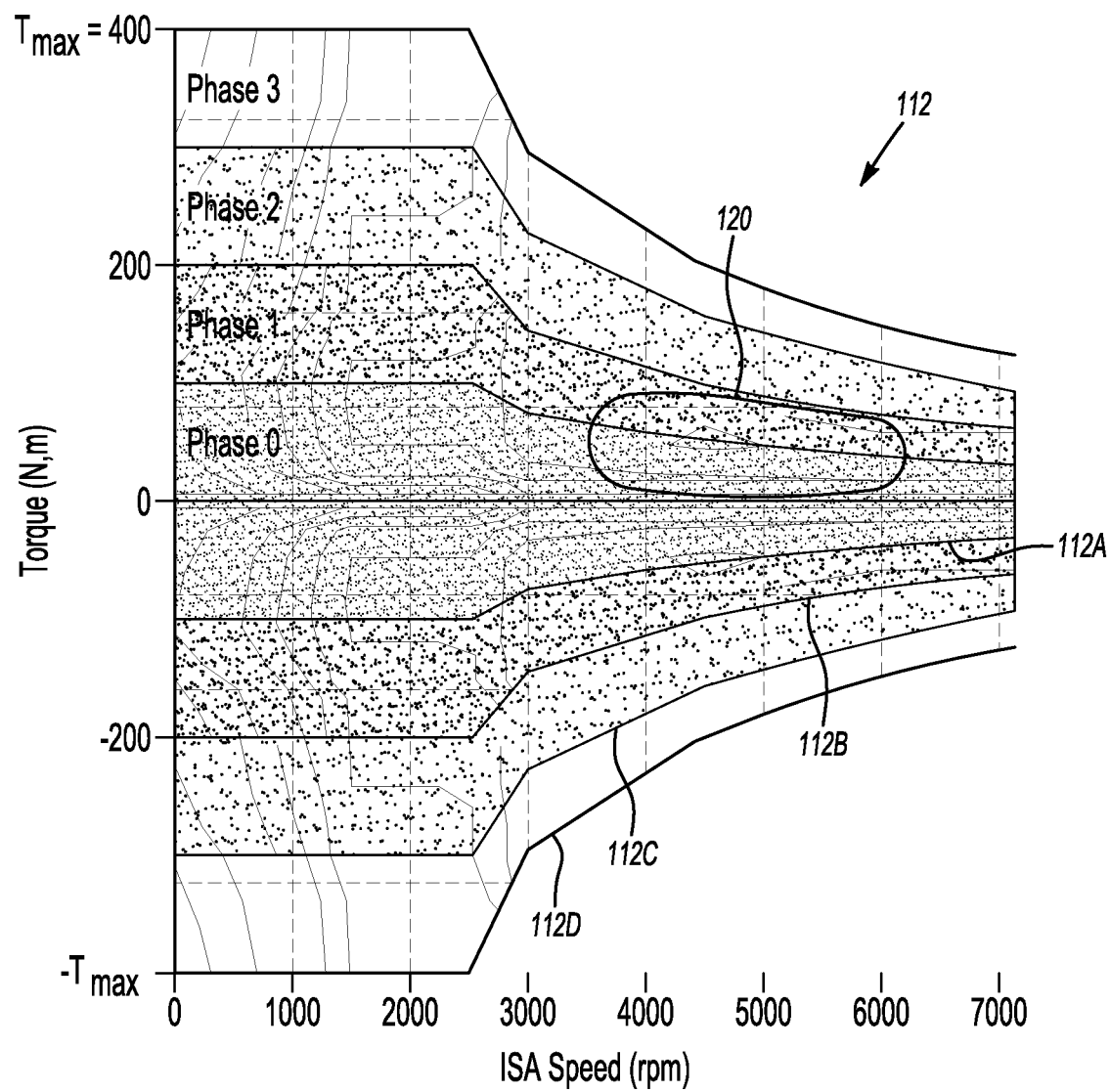
FIG. 3 is a schematic graph of the stackable motor output for the second embodiment of the vehicle shown in FIG. 2.

FIGS. 2-3 illustrate a second embodiment of the vehicle 110 including at least one motor 112, and a transmission 114. The vehicle 110 may be an electric vehicle or a hybrid electric vehicle 110. Therefore, in addition to the at least one motor 112 the vehicle 110 may also include an internal combustion engine 116.

In the embodiment shown, there are four motors, 112A, 112B, 112C, 112D to drive the vehicle 110. As explained above any number of motors, 112 may be combined to provide the capacity required by the vehicle 110. In this manner one large electric motor may be replaced by multiple smaller motors 112.

The first through fourth motors 112A-D are operatively connected to one another and may be coupled together by directly, through clutches, or indirectly, such as by a serpentine belt. Direct coupling of the first through fourth motors 112A-D would provide an efficient arrangement with few losses. Indirect coupling may provide a more flexible arrangement for packaging the first through fourth motors 112A-D within the vehicle 10. One skilled in the art would be able to select the manner of coupling most suited for a particular vehicle 110.

One of the motors 112 may be designated as the primary motor 112A and the other motors 112B-D may provide additional power and torque as required by the vehicle 110. When the capacity of the first motor 112A is exceeded or when the first motor 112A begins to operate outside the efficiency range, the additional motors 112B-D may be engaged. The additional motors 112B-D may each provide the same amount of additional power and torque. Alternatively, the additional motors 112B-D may be engaged in an incremental manner. For example, the second motor 112B may be engaged to assist the first motor 112A when the capacity of the first motor 112A is exceeded or when the first motor 112A begins to operate outside the efficiency range. When the capacity of the first motor 112A and the second motor 112B are exceeded or when the first motor 112A and the second motor 112B begin to operate outside the efficiency ranges, then the third motor 112C may be engaged. Likewise, the fourth motor 112D would engage when the capacity/efficiency of the first through third motors 112A-C are exceeded. Similar to the embodiment explained above, the motor 112A-D which acts as the primary power source for the vehicle 10 may alternate among the first through fourth motors 112A-D to maintain even overall wear on the first through fourth motors 112A-D.

Additionally, any one of the first through fourth motors 112A-D may act as the primary motor in case of mechanical trouble of one of the other motors 112A-D. For example, if the first motor 112A is acting as the primary motor and incurs mechanical trouble the second motor 112B may then be used as the primary motor and the first motor may be disengaged until the mechanical trouble can be corrected. In the instance of trouble for any of the motors 112A-D then the motor 112A-D chosen to be the primary motor and the additional operating motors 112A-D would not be able to meet the full capacity of the vehicle 110. However, the vehicle 110 would operate in a restricted or limp-home mode but would allow the vehicle 110 operator to reach their destination.

FIG. 3 is a graph which illustrates how the output of the first through fourth motors 112A-D may be combined to allow the first through fourth motors 112A-D to primarily operate within their efficiency ranges while combining to provide the capacity required by the vehicle 110. Phase 0 indicates the output of the first motor 112A. Phase 1 indicates the output of the second motor 112B as operating along with the first motor 112A such that the torque output is increased. Phase 3 indicates the output of the motors when the first through third motors 112A-C are operating together and Phase four indicates the output of all the motors 112A-D operating at the same time. The efficiency range for the motors 112A-D is indicated at area 120. By adding the outputs of the motors 112A-D together each of the motors 112A-D each motor 112A-D can continue to operate within the efficiency range 120 while providing an increase in the total output torque.

FIG. 4 schematically illustrates a third embodiment of a vehicle 210 having a first motor 212A and a second motor 212B. The first motor 212A and the second motor 212B are coupled directly together. Direct coupling of the first motor 12A to the second motor 12B provides an efficient arrangement with few losses. The first motor 212A has a first input member 222A and a first output member 224A. Likewise, the second motor 212B has a second input member 222B and a second output member 224B. The first output member 224B is connected to the second input member 224A. In the embodiment shown, the first and second input members 222A and 222B are female input shafts and the first and second output members 224A and 224B are male output shaft. However, any arrangement of input members 222A-B and output members 224A-B that would mate together may be utilized.

The first motor 212A and the second motor 212B are identical and have the same input members 222A-B and output members 224A-B. Additional motors (not shown) may be connected to the first and second motors 212A-B and would have the same input members and output members. Therefore, any number of motors 212 may be connected in any order as required to provide the capacity of the vehicle 210.

In the embodiment shown in FIG. 4, the second motor 212B is connected to the transmission 214 and acts as the primary motor to drive the vehicle 210 while operating at steady speeds. The first motor 212A acts as an additional power source and engages to drive the vehicle 210 when additional operating loads are placed on the motors 212A-B, such as during accelerations of the vehicle 110. The first motor 212A would engage any time the operating loads exceed the capacity of the second motor 212B. Alternatively the first motor 212A may be engaged prior to reaching the capacity of the second motor 212B and at any time when the second motor 212B begins to operate outside of the desired efficiency range. In this manner, the first motor 212A and the second motor 212B may both operate within their efficiency range for greater periods of time and the overall vehicle 210 efficiency will be increased.

In the above embodiment, the second motor 212B is the primary motor for the vehicle 210 and the first motor 212A is used to provide additional power and torque when required by the vehicle 10. Alternatively, the first motor 212A may be the primary motor and the second motor 212B may be used to provide additional power and torque. Additionally, the first motor 212A and the second motor 212B may alternately be the primary motor and the other would provide the additional power and torque. In this manner, even overall wear on both the first motor 212A and the second motor 212B may be maintained. The first motor 212A has a first rotor 226A and the second motor 212B has a second motor 226B. Due to the direct connection between the first motor 212A and the second motor 212B the rotor 226A or 226B of the additional motor 212A or 212B would continue to rotate while the primary motor 212B or 212A operates even though the additional motor 212A or 212B is not operating.

Additionally, either the first motor 212A or the second motor 212B may act as the primary motor if case of mechanical trouble of the other motor 212A-B. In this instance the primary motor 212B or A would not be able to meet the full capacity of the vehicle 210. However, the vehicle 210 would operate in a restricted or limp-home mode but would allow the vehicle 210 operator to reach their destination.

FIG. 5 schematically illustrates a fourth embodiment of a vehicle 310 having a first motor 312A and a second motor 312B. The first motor 312A has a first input member 322A and a first output member 324A. Likewise, the second motor 312B has a second input member 322B and a second output member 324B.

The first motor 312A is connected to the second motor 312B through a first clutch 328A. That is, the first clutch 328A has a first clutch input member 330A and a first clutch output member 330B. The first motor output member 324A is connected to the first clutch input member 330A and the first clutch output member 332A is connected to the second motor input member 322B.

The second motor 312B is connected to a transmission 314 for the vehicle 310 through a second clutch 328B. That is, the second clutch 328B has a second clutch input member 330B and a second clutch output member 332B. The second motor output member 324B is connected to the second clutch input member 330B and the second clutch output member 332B is connected to the transmission 314.

The first motor 312A, the second motor 312B, the first clutch 328A and the second clutch 328B are generally identical and each have the same input members 322A-B, 330A-B and output members 324A-B, 332A-B as one another. Additional motors and clutches (not shown) may be connected to the first and second motors 312A-B and the first and second clutches 328A-B and would have the same input members and output members. Therefore, any number of motors 312 may be connected through the clutches 328A-B as required to provide the capacity required by the vehicle 310.

In the embodiment shown, the first and second motor input members 322A and 322B are female input members and the first and second motor output members 324A and 324B are male output members. Likewise, the first and second clutch input members 330A-B are female input members and the first and second clutch output members 332A-B are male output members. However, any arrangement of input members 322A-B, 330A-B and output members 324A-B, 332A-B may be utilized which would allow the first and second motors 312A-B to be connected through the first and second clutches 328A-B In the embodiment shown, the second motor 312B is connected through the second clutch 328B to the transmission 314 and acts as the primary motor and to drive the vehicle 310 is operating at steady speeds. The first motor 312A acts as an additional power source and engages to drive the vehicle 310 when additional operating loads are placed on the motors 312A-B, such as during accelerations of the vehicle 110. The first motor 312A would engage any time the operating loads exceed the capacity of the second motor 312B. Alternatively, the first motor 312A may be engaged prior to reaching the capacity of the second motor 312B and at any time when the second motor 312B begins to operate outside of the desired efficiency range. In this manner, the first motor 312A and the second motor 312B may both operate within their efficiency range for greater periods of time and the overall vehicle 310 efficiency will be increased.

The first motor 312A has a first rotor 326A and the second motor 312B has a second motor 326B. The first rotor 326A does not rotate when the second motor 312B is operating and the first motor 312A is not operating. This is due to the first motor 312A and the second motor 312B being connected through the clutch 328A which can be disengaged when the first motor 312A is not operating.

Additionally, the first motor 312A or the second motor 312B may act as the primary motor if case of mechanical trouble of the other motor 312A or 312B. In this instance the primary motor 312B or 312A would not be able to meet the full capacity of the vehicle 310. However, the vehicle 310 would operate in a restricted or limp-home mode but would allow the vehicle 310 operator to reach their destination.

FIG. 6 schematically illustrates a fifth embodiment of a vehicle 410 having a first motor 412A and a second motor 412B. The second motor 412B is connected to a transmission 414. The first motor 412a and the second motor 412b are indirectly connected by a serpentine belt 450.

FIG. 7 schematically illustrates a sixth embodiment of a vehicle 510 having a first motor 512A and a second motor 512B. The second motor 512B is connected to a transmission 514. The first motor 512a and the second motor 512b are operatively connected to a drive mechanism 550 having a plurality of selectable gear ratios. A selected gear ratio of the plurality of selectable gear ratios of the drive mechanism is selected to maintain operation of the first motor 512A and the second motor 512B in a predetermined efficiency range.

In the embodiment described above the motors 12, 112, 212, 312 are described as being generally identical to one another. That is, the motors 12, 112, 212, 312 have the same general size, capacity and preferably configuration of one another. Alternatively, this may mean for a particular vehicle 10, 110, 210, 310 configuration the motors 12, 112, 212, 312 of that vehicle 10 are able to be used interchangeably with one another.

While the best modes for carrying out the invention have been described in detail, those familiar with the art to which this invention relates will recognize various alternative designs and embodiments for practicing the invention within the scope of the appended claims.

The invention claimed is:

1. A system for powering a vehicle, comprising:
    a plurality of motors operatively connected with one another, the plurality of motors are operable to power the vehicle individually and in combination with one another, each motor of the plurality of motors are identical, the plurality of motors include at least a first motor directly connected to a second motor, the second motor configured as a primary motor and connected to a transmission, the first motor providing an additional power source and selectively engaging the second motor for driving the vehicle when an operating load exceeding a capacity of the second motor is placed on the second motor, wherein the primary motor status alternates between the first and second motors maintaining even wear of the first and the second motors.

2. The system for powering the vehicle of claim 1, further comprising:
    at least one clutch, wherein the at least one clutch is located between adjacent motors of the plurality of motors to thereby connect the adjacent motors of the plurality of motors.

3. The system for powering the vehicle of claim 2, wherein the at least one clutch is engaged to operatively-connect the adjacent motors of the plurality of motors.

4. The system for powering the vehicle of claim 2, further comprising:
    a transmission, wherein the adjacent motors include at least a first motor connected to a second motor, wherein the at least one clutch includes at least a first clutch and a second clutch, wherein the first motor is connected to the first clutch, wherein the first clutch is connected to the second motor, wherein the second motor is connected to the second clutch, wherein the second clutch is connected to the transmission.

5. The system for powering the vehicle of claim 4,
    wherein the first motor includes a male output member that is connected to a female input member of the first clutch,
    wherein the first clutch includes a male output member that is connected to a female input member of the second motor,
    wherein the second motor includes a male output member that is connected to a female input member of the second clutch,
    wherein the second clutch includes a male output member that is connected to the transmission.

6. The system for powering the vehicle of claim 1, wherein at least one motor of the plurality of motors is indirectly connected to another motor of the plurality of motors with a serpentine belt.

7. The system for powering the vehicle of claim 1, wherein the plurality of motors are operatively connected to
    a drive mechanism having a plurality of selectable gear ratios.

8. The system for powering the vehicle of claim 1, wherein each motor of the plurality of motors is similar in size and capacity.

9. The system for powering the vehicle of claim 1, further comprising:
    a transmission, wherein the plurality of motors includes at least a first motor connected to a second motor, wherein the second motor is connected to the transmission.

10. The system for powering the vehicle of claim 9, wherein the first motor includes male output shaft, wherein the second motor includes a female input shaft, wherein the male output shaft is connected to the female input shaft for directly connecting the first motor to the second motor.

11. A system for powering a vehicle, comprising:
    a plurality of motors, each motor of the plurality of motors operatively connected with one another, the plurality of motors operable to power the vehicle individually and in combination with one another such that each motor of the plurality of motors operates in a predetermined efficiency range, the plurality of motors include at least a first motor directly connected to a second motor, the second motor configured as a primary motor and connected to a transmission, the first motor providing an additional power source and selectively engaging the second motor for driving the vehicle when an operating load exceeding a capacity of the second motor is placed on the second motor, wherein the primary motor status alternates between the first and second motors maintaining even wear of the first and the second motors.

12. The system for powering the vehicle of claim 11, further comprising:
    at least one clutch, wherein the at least one clutch is located between adjacent motors of the plurality of motors to thereby connect the adjacent motors of the plurality of motors.

13. The system for powering the vehicle of claim 11, wherein the plurality of motors are operatively connected to
    a drive mechanism having a plurality of selectable gear ratios.

14. The vehicle of claim 11, wherein the plurality of motors are identical to one another, wherein each motor of the plurality of motors is similar in size and capacity.

15. A method, comprising:
    operatively connecting a plurality of identical motors with one another in a vehicle, the plurality of identical motors include at least a first motor directly connected to a second motor, wherein the second motor is assigned a primary motor status and connected to a transmission for operating the vehicle while the first motor provides an additional power source and selectively engages to the second motor for
    driving the vehicle when an operating load exceeding capacity of the second motor is placed on the second motor;
    powering the vehicle with the plurality of identical motors individually and in combination with one another to operate each motor of the plurality of identical motors within a predetermined efficiency range; and
    maintaining even wear of the first motor and the second motor by alternating the primary motor status between the first motor and the second motor.

16. The method of claim 15, wherein operatively connecting the plurality of motors further comprises
    connecting adjacent motors of the plurality of motors with at least clutch.

17. The method of claim 16, wherein the step of powering the vehicle with the plurality of identical motors in combination with one another further comprises
    engaging the at least one clutch to operate adjacent motors.

18. The method of claim 15, wherein the step of operatively connecting the plurality of motors further comprises indirectly connecting at least one motor of the plurality of motors to another motor of the plurality of motors with a serpentine belt.

19. The vehicle of claim 15, wherein the step of powering the vehicle with the plurality of motors in combination with one another occurs at least during a step of accelerating the vehicle.

20. The method of claim 15, further comprising selecting one gear ratio of a plurality of gear ratios of a drive mechanism that is operatively connected to the plurality of motors for maintaining operation of the plurality of motors in the predetermined efficiency range.

21. The method of claim 15, wherein the alternating step is conducted in response to determining a mechanical issue related to one of the first motor or the second motor and permitting the vehicle to be powered by the other of the first motor and the second motor for operating in a limp-home mode.

\* \* \* \* \*